US011332653B2

(12) United States Patent
Lee et al.

(10) Patent No.: US 11,332,653 B2
(45) Date of Patent: May 17, 2022

(54) DRILLING FLUID

(71) Applicant: SHELL OIL COMPANY, Houston, TX (US)

(72) Inventors: Burnell Lee, League City, TX (US); David Matthew Brown, Amsterdam (NL); Graham Francis Whale, Manchester (GB); Michael James Spence, Brussels (BE); Delina Yvonne-Marie de Souza Lyon, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/634,976

(22) PCT Filed: Jul. 30, 2018

(86) PCT No.: PCT/EP2018/070578
§ 371 (c)(1),
(2) Date: Jan. 29, 2020

(87) PCT Pub. No.: WO2019/025358
PCT Pub. Date: Feb. 7, 2019

(65) Prior Publication Data
US 2021/0122964 A1 Apr. 29, 2021

(30) Foreign Application Priority Data
Aug. 1, 2017 (EP) .................................... 17184266

(51) Int. Cl.
*C09K 8/34* (2006.01)
*E21B 21/00* (2006.01)

(52) U.S. Cl.
CPC ................ *C09K 8/34* (2013.01); *E21B 21/00* (2013.01)

(58) Field of Classification Search
None
See application file for complete search history.

(56) References Cited

U.S. PATENT DOCUMENTS

| | | | |
|---|---|---|---|
| 6,057,272 A | 5/2000 | Gee et al. | |
| 6,410,488 B1 | 6/2002 | Fefer et al. | |
| 7,081,437 B2 | 7/2006 | Patel et al. | |
| 7,534,743 B2 | 5/2009 | Kirsner et al. | |
| 7,666,820 B2 | 2/2010 | Mueller et al. | |
| 9,976,098 B2 * | 5/2018 | Jeon | B01J 23/44 |
| 2003/0171632 A1 * | 9/2003 | Du Toit | C10G 50/00 585/533 |
| 2003/0236175 A1 * | 12/2003 | Twu | C07C 6/04 507/200 |
| 2004/0198618 A1 | 10/2004 | Abazajian et al. | |
| 2009/0018374 A1 | 1/2009 | Bijlsma et al. | |
| 2010/0282467 A1 * | 11/2010 | Hutchison | C07C 303/06 166/305.1 |
| 2012/0325492 A1 | 12/2012 | Fefer et al. | |
| 2016/0075931 A1 * | 3/2016 | Jeon | C09K 8/34 507/103 |
| 2016/0083640 A1 | 3/2016 | Van Slyke et al. | |

FOREIGN PATENT DOCUMENTS

| | | |
|---|---|---|
| EP | 2952552 A1 | 12/2015 |
| WO | 02102941 A2 | 12/2002 |
| WO | 03070857 A1 | 8/2003 |
| WO | 2004009739 A2 | 1/2004 |
| WO | 2007082589 A1 | 7/2007 |
| WO | 2013048972 A2 | 4/2013 |

OTHER PUBLICATIONS

International Search Report and Written Opinion received for PCT Patent Application No. PCT/EP2018/070578, dated Oct. 23, 2018, 11 pages.
Dorn et al., "Chemical Properties Affecting the Environmental Performance of Synthetic Based Drilling Fluids for the Gulf of Mexico", SPE 142008, SPE Americas E&P Health, Safety, Security, and Environmental Conference, Jan. 1, 2011, XP055514774.
"Shell GTL Sarapar 147", Data sheet, Synthetic Base Drilling Fluid, Shell MDS (Malaysia) Sendirian Berhad, Apr. 2019, 3 pages.

* cited by examiner

*Primary Examiner* — John J Figueroa
(74) *Attorney, Agent, or Firm* — Shell Oil Company

(57) ABSTRACT

The present invention relates to drilling fluid comprising one or more linear internal olefin having from 15 to 18 carbon atoms and containing less than 25% branching based on the total amount of the linear internal olefin and a hydrogenated Fischer-Tropsch derived product.

15 Claims, No Drawings

DRILLING FLUID

CROSS REFERENCE TO RELATED APPLICATIONS

This is a national stage application of International application No. PCT/EP2018/070578, filed 30 Jul. 2018, which claims priority of European application No. 17184266.9, filed 1 Aug. 2017.

FIELD OF THE INVENTION

The present invention relates to a drilling fluid and a process to prepare said drilling fluid. The present invention also relates to the use of said drilling fluid for improving biodegradability and lower toxicity in drilling fluid compositions.

BACKGROUND OF THE INVENTION

Non-aqueous drilling fluids comprising linear internal olefins which pass the EPA 275-day anaerobic degradation test and the EPA sedimentation toxicity test are known in the art. Typically linear internal olefins used for non-aqueous drilling fluids are tetradecene, hexadecene, and octadecene. However, there is a product volume issue with olefins for aqueous drilling fluids. To overcome that problem, olefins and blends of alkenes and/or alkanes are being mixed with other compounds. For example in US 2012/0325492 A1 paraffins are added to the olefins to overcome said problem. In addition to the paraffins esters also need to be added because the paraffins are not biodegradable. The disadvantage is that esters have technical problems when present in drilling fluids because the reactive ester bond can be broken under drilling conditions leading to failure of the drilling fluid and potential loss of a well.

It is an object of the invention to provide a drilling fluid comprising a paraffin, which does not need an ester to pass the biodegradability and toxicity test.

It is a further object to provide a high volume of drilling fluid.

SUMMARY OF THE INVENTION

From a first aspect, above and other objects may be achieved according to the present invention by providing a drilling fluid comprising one or more linear internal olefin having from 15 to 18 carbon atoms and containing less than 25% branching based on the total amount of the linear internal olefin and a hydrogenated Fischer-Tropsch derived product.

It has been found that the drilling fluid of the present invention passes the anaerobic biodegradability and sedimentation toxicity tests without the use of esters in drilling fluid compositions.

An advantage of the present invention is that because of the use of a less branched internal olefin in the drilling fluid of the present invention is that more Fischer-Tropsch product can be added and therefore higher volumes of drilling fluids can be produced. In this way, the product volume issue can be solved.

Another advantage is that the linear internal olefins used in the drilling fluid of the present invention contains less than 25% branching and therefore more capable of adding a Fischer-Tropsch product and still pass the anaerobic biodegradability and sedimentation toxicity test.

DETAILED DESCRIPTION

The following detailed description does not limit the invention. Instead, the scope of the invention is defined by the appended claims.

According to the present invention, a drilling fluid comprises one or more linear internal olefin having from 15 to 18 carbon atoms and containing less than 25% branching based on the total amount of the linear internal olefin and a hydrogenated Fischer-Tropsch derived product.

Typical linear internal olefins used as the base fluid or continuous phase for non-aqueous drilling fluids are a linear internal olefins with a carbon length of 16 and one with a carbon length of 18.

For example, WO 2013048972, EP 295 2552 A1 and U.S. Pat. No. 7,534,743 B2 disclose the use of linear internal olefins having from 15 to 18 carbon atoms as base fluid in synthetic linear olefin oil field drilling fluids and the process for making said internal olefins and/or drilling fluids.

The linear internal olefin used in the drilling fluid according to the present invention preferably has a flash point according to ASTM D93 in a range of from 130 to 170° C., preferably in a range of from 135 to 160° C.

Also, the pour point of the linear internal olefin according to ASTM D97 is less than −3° C., preferably less than −10 and more preferably less than −15. Suitably, the kinematic viscosity at 40° C. according to ASTM D445 is in a range of from 2.0 to 5.0 mm$^2$/s, preferably in a range of from 2.5 to 5 mm$^2$/s.

Preferably, the drilling fluid according to the present invention having a linear internal olefin with 16 carbon atoms and a linear internal olefin with 18 carbon atoms.

Also, the drilling fluid according to the present invention having a linear internal olefin with 15 carbon atoms and a linear internal olefin with 18 carbon atoms.

Suitably, the drilling fluid according to the present invention is a non-aqueous drilling fluid (NADF).

More preferably, the drilling fluid according to the present invention is a synthetic linear olefin oil field drilling fluid.

The linear internal olefin preferably contains less than 20 wt % branching, more preferably less than 10 wt. % branching based on the total amount of the linear internal olefin. Typically, branching of the linear internal olefin is determined with gas chromatography analysis.

The Fischer-Tropsch derived normal paraffin or base oil composition is derived from a Fischer-Tropsch process. Fischer-Tropsch product stream is known in the art. By the term "Fischer-Tropsch derived" is meant a normal paraffin or base oil is, or is derived from a Fischer-Tropsch process. A Fischer-Tropsch derived normal paraffin composition may also be referred to a GTL (Gas-to-Liquids) product. An example of a Fischer-Tropsch process is given in WO2002/102941, EP 1 498 469 and WO2004/009739, the teaching of which is incorporated by reference. Suitably, the Fischer-Tropsch product stream is hydrogenated to convert the olefins and oxygenates in the Fischer-Tropsch stream obtained by the Fischer-Tropsch process into paraffins. This hydrogenated product is further processed and separated to obtain a hydrogenated Fischer-Tropsch derived normal paraffin having from 14 to 18 carbon atoms and/or a Fischer-Tropsch derived base oil having from 20 to 28 carbon atoms.

Preferably, the hydrogenated Fischer-Tropsch derived product is a Fischer-Tropsch derived (FT) normal paraffin having from 14 to 18 carbon atoms or Fischer-Tropsch derived base oil having from 20 to 28 carbon atoms. More preferably, the hydrogenated Fischer-Tropsch derived product is a hydrogenated FT normal paraffin having from 14 to 17 carbon atoms.

Suitably, the hydrogenated Fischer-Tropsch derived normal paraffin having from 14 to 18 carbon atoms comprises paraffins, primarily n-paraffins. Preferably, the hydrogenated Fischer-Tropsch derived normal paraffin having from 14 to 18 carbon atoms comprises more than 85 wt. % of n-paraffins, preferably more than 90 wt. % of n-paraffins. In addition, the hydrogenated Fischer-Tropsch derived normal paraffin having from 14 to 18 carbon atoms comprises less than 15 wt. % of i-paraffins, preferably less than 10 wt. %.

The Fischer-Tropsch product stream is derived from a Fischer-Tropsch process. Fischer-Tropsch product stream is known in the art. By the term "Fischer-Tropsch product" is meant a synthesis product of a Fischer-Tropsch process. In a Fischer-Tropsch process synthesis gas is converted to a synthesis product. Synthesis gas or syngas is a mixture of hydrogen and carbon monoxide that is obtained by conversion of a hydrocarbonaceous feedstock. Suitable feedstock include natural gas, crude oil, heavy oil fractions, coal, biomass and lignite. A Fischer-Tropsch product derived from a hydrocarbonaceous feedstock which is normally in the gas phase may also be referred to a GTL (Gas-to-Liquids) product. The preparation of a Fischer-Tropsch product has been described in e.g. WO2003/070857.

The product stream of the Fischer-Tropsch process is usually separated into a water stream, a gaseous stream comprising unconverted synthesis gas, carbon dioxide, inert gasses and C1 to C3, and a C4+ stream.

The full Fischer-Tropsch hydrocarbonaceous product suitably comprises a C1 to C300 fraction.

Lighter fractions of the Fischer-Tropsch product, which suitably comprises C3 to C9 fraction are separated from the Fischer-Tropsch product by distillation thereby obtaining a Fischer-Tropsch product stream, which suitably comprises C10 to C300 fraction.

The weight ratio of compounds having at least 60 or more carbon atoms and compounds having at least 30 carbon atoms in the Fischer-Tropsch product is preferably at least 0.2, more preferably 0.3.

Typical hydrogenation conditions for hydrogenation of the above fractions are described in e.g. WO2007/082589.

The content of olefins and oxygenates in the hydrogenated Fischer-Tropsch derived normal paraffin comprising 14 to 18 carbon atoms or Fischer-Tropsch derived base oil comprising 20 to 28 carbon atoms is less than 0.1 wt. %, preferably less than 0.05 wt. %. Also, the hydrogenated FT normal paraffin having from 14 to 18 carbon atoms comprises 14 carbon atoms in a range of from 25 to 27 wt. %, 15 carbon atoms in a range of from 24 to 26 wt. %, 16 carbon atoms in a range of from 22 to 23 wt. %, 17 carbon atoms in a range of from 18 to 20 wt. % and 18 carbon atoms in a range of from 4 to 6 wt. % based on the amount of the normal paraffin having from 14 to 18 carbon atoms.

The hydrogenated Fischer-Tropsch derived base oil preferably has a density at 15° C. according to ISO 12185 of between 806 and 808 kg/m$^3$, a viscosity index according to ISO2909 of between 110 and 118, a pour point according to ISO3016 of between −39° C. and −51° C. a kinematic viscosity at 100° C. according to ISO3104 of between 2.5 and 2.7.

Fischer-Tropsch derived base oil having a density at 15° C. according to ISO 12185 of 806 kg/m$^3$, a viscosity index according to ISO2909 of 118, a pour point according to ISO3016 of −39° C. and a kinematic viscosity at 100° C. according to ISO3104 of 2.6 is commercially available from Royal Dutch Shell under the Risella X tradename, including Risella X 415.

Preferably, the amount of hydrogenated FT normal paraffin in the drilling fluid according to the present invention is at least 30 wt. %, more preferably of at least 40 wt. % based on the total amount of the linear internal olefin and the normal paraffin.

Preferably, the amount of hydrogenated FT base oil in the drilling fluid according to the present invention is at least 15 wt. %, more preferably of at least 20 wt. % based on the total amount of the linear internal olefin and the base oil.

In addition, the drilling fluid preferably comprises a linear internal olefin containing less than 10% branching and a hydrogenated FT derived normal paraffin in an amount of at least 30 wt. % based on the total amount of the internal olefin and the hydrogenated FT derived normal paraffin.

Also, the drilling fluid preferably comprises a linear internal olefin containing less than 10% branching and a hydrogenated FT derived base oil in an amount of at least 15 wt. % based on the total amount of the internal olefin and the hydrogenated FT derived base oil.

Preferably, the drilling fluid comprising a linear internal olefin with 16 carbon atoms and a linear internal olefin with 18 carbon atoms, both olefins containing less than 10% branching, and a hydrogenated FT derived normal paraffin having from 14 to 18 carbon atoms in an amount of at least 30 wt. % based on the total amount of the linear internal olefins and the hydrogenated FT derived normal paraffin.

The drilling fluid according to the present invention may—in addition to the FT derived normal paraffin or base oil and the linear internal olefin—further comprising drilling additives that are well known in the art. The drilling fluid additives are not particularly limited as long as they do not interfere with the desired properties of the embodied drilling fluids. The drilling additives include one or more of the following drilling fluid additives: a solvent suitable for applications well known in the art, such as water or brine, surfactants (e.g. emulsifiers, wetting agents), viscosifiers, weighting agents, fluid loss control agents, and shale inhibiting salts. Because the drilling fluids according to the enclosed embodiments are intended to be non-toxic, these optional ingredients are preferably also non-toxic.

In a further aspect, the present invention provides a process to prepare a drilling fluid according to the present invention, which process comprises a step of adding a hydrogenated FT derived normal paraffin or base oil to a linear internal olefin.

Processes to prepare drilling fluids are known in the art and therefore not described here in detail. Typical processes to prepare synthetic linear olefin oil field drilling fluids drilling fluids are for example described in WO 2013048972, EP 295 2552 A1 and U.S. Pat. No. 7,534,743 B2.

Preferably, the amount of hydrogenated FT derived normal paraffin or base oil added to the internal olefin is in a range of from 15 to 30 wt. % based on the total amount of the hydrogenated FT derived normal paraffin or base oil and the linear internal olefin. Also, the linear internal olefin used in the process to prepare the drilling fluid according to the present invention contains less than 10% branching.

In another aspect, the present invention provides the use of a drilling fluid for improving the anaerobic biodegradability and lower the sediment toxicity of linear internal olefins and hydrogenated FT derived products in drilling fluid compositions.

The drilling fluid according to the present invention has a biodegradation rate ratio according to ISO 11734:1995 of less than 1 and a sediment toxicity base fluid according to ASTM Method E1367-99 of less than 1.

Preferably, the drilling fluid according to the present invention comprises 30 wt. % of hydrogenated FT derived normal paraffin and a linear internal olefin containing less than 20 wt %, preferably less than 10 wt. % branching having a biodegradation rate ratio according to ISO 11734: 1995 of less than 1 and a sediment toxicity base fluid according to ASTM Method E1367-99 of less than 1.

The present invention is described below with reference to the following Examples, which are not intended to limit the scope of the present invention in any way.

EXAMPLES

Example 1

Characterization of the Linear Internal Olefins

The following example described the characterization of samples that were tested to illustrate the effect of the linear internal olefins on the desirable properties of an olefin blend drilling fluid. These internal olefins are commercially available from Shell Chemicals under trade names: NEOFLO™ 1-58 internal olefin and NEOFLO™ 1-68i internal olefin.

Two commercially available C1618 internal olefin samples were characterized for comparison:
Sample a and Sample B.

Each sample was characterized for carbon number distribution (% wt at each carbon number), total branching, pour point, kinematic viscosity at 40° C. and flash point. The characterization is presented in Table 1.

atoms and the commercially available Risella X415 was used as the FT derived base oil for preparing the drilling fluids.

The drilling fluid comprising Sarapar 147 was prepared by adding 70 g of Sarapar 147 to 30 g of the internal olefins as indicated in Table 2. The drilling fluid comprising Risella X415 was prepared by adding 85 g of Risella X415 to NEOFLO 1-58.

Example 3

The samples as prepared in Example 2 were tested for two environmental properties that are important for olefin based drilling fluids designed for offshore and shelf applications: sediment toxicity and anaerobic biodegradation. These parameters are important because drilling cuts with these materials may be discharged to the environment when used in offshore drilling and they must have low toxicity and good biodegradability under anaerobic conditions in order to minimize environmental impact when discharged.

The samples were tested for sediment toxicity against C16-C18 internal olefins as reference to evaluate the sediment toxicity ratio (STR) of the base fluid. This test was carried out according to ASTM E1367-99 method: Standard Guide for Conducting Static Sediment Toxicity Tests with Marine and Estuarine Amphipods (Available from the American Society for Testing and Materials, 100 Barr Harbor Drive, West Conshohocken, Pa., 19428) with *Leptocheirus plumulosus* as the test organism and sediment preparation procedures specified in Appendix 3 of 40 CFR Part 435, Subpart A and the method found in Appendix A of "Final NPDES General Permit for New and Existing Sources and New Dischargers in the Offshore Subcategory of the Oil and

TABLE 1

| Internal Olefin (IO) | Carbon number distribution (wt. %) | NEOFLO™ 1-58 C1518 IO | NEOFLO™ 1-68i C1618 IO | Comparative Example A Sample A C1618 IO | Comparative Example B Sample B C1618 IO |
|---|---|---|---|---|---|
| C1518 IO | <C14 | 0.9 | 0.9 | 0.3 | 0.1 |
| | C15 | 22.1 | | | |
| | C16 | 23.4 | 51.3 | 64.3 | 54.4 |
| | C17 | 23.3 | | | |
| | C18 | 21.9 | 38.8 | 34.4 | 37.8 |
| | C19+ | 8.4 | | | |
| | C20+ | | 9.0 | | 7.7 |
| Total branching (wt %) according to GC analysis | | 6.7 | 19.0 | 27.4 | 39.3 |
| Pour point (° C.) by ASTM D93 | | −12 | −4 | −10 | −12 |
| Kinematic viscosity at 40° C. (mm$^2$/s) by ASTM D 445 | | 3 | 3.0 | 2.8-3.5 | 3.0 |
| Flash point (° C.) by ASTM D93 | | 135.0 | 135.0 | 135.00* | 137.0 |

*This value was estimated

Example 2

Preparation of Drilling Fluids Comprising Linear Internal Olefins and FT Derived Products The commercially available Sarapar 147 was used as the FT derived normal paraffin having from 14 to 17 carbon Gas Extraction Category for the Western Portion of the Outer Continental Shelf of the Gulf of Mexico (GMG290000)". This is a 10-day sediment toxicity test. The samples comprising internal olefins and FT derived normal paraffin having from 14 to 18 carbon atoms (Sarapar 147) or base oil (Risella X415) passed the test with a BTR of from 0.1 to 0.8 (must be less than or equal to 1.0 to pass the test). A summary of comparative sediment toxicity ratios for the other samples is shown in Table 2.

The samples were also tested for biodegradability under anaerobic conditions to determine the base fluid biodegradation rate ratio (BRR). Testing was carried out using Modified ISO 11734:1995 method: "Water quality—Evaluation of the 'ultimate' anaerobic biodegradability of organic compounds in digested sludge—Method by measurement of the biogas production (1995 edition)" (Available from the American National Standards Institute, 11 West 42nd Street, 13th Floor, New York, N.Y. 10036) supplemented with modifications in Appendix 4 of 40 CFR Part 435, Subpart A and detailed in Appendix B of "Final NPDES General Permit for New and Existing Sources and New Dischargers in the Offshore Subcategory of the Oil and Gas Extraction Category for the Western Portion of the Outer Continental Shelf of the Gulf of Mexico (GMG290000)". This is a 275-day anaerobic biodegradation test. The samples comprising internal olefins and FT derived normal paraffin having from 14 to 18 carbon atoms (Sarapar 147) or base oil (Risella X415) passed the test with a BRR of from 0.6 to 0.9 (must be less than or equal to 1.0 to pass the test) according to US EPA general permit in the Gulf of Mexico (GMG290000). A summary of comparative sediment toxicity ratios for the other samples is shown in Table 2.

Also, Shell's NEOFLO 1-58 olefin can be blended with a synthetic GTL base oil, Risella X 415, at 15% and still pass the anaerobic biodegradation test with a BRR of 0.6.

The above indicated observations indicate that FT derived products can be used in drilling fluids without using esters and without a negative effect on the anaerobic biodegradability and the sediment toxicity of that drilling fluid because of the use of linear internal olefins containing less than 20 wt. % of branching.

That which is claimed is:

1. A drilling fluid comprising one or more linear internal olefin having from 15 to 18 carbon atoms and containing less than 25% branching based on the total amount of the linear internal olefin and a hydrogenated Fischer-Tropsch derived product comprising a Fischer-Tropsch normal paraffin having from 14 to 18 carbon atoms.

2. The drilling fluid according to claim 1, having a linear internal olefin with 16 carbon atoms and a linear internal olefin with 18 carbon atoms.

3. The drilling fluid according to claim 1, having a linear internal olefin with 15 carbon atoms and a linear internal olefin with 18 carbon atoms.

4. The drilling fluid according to claim 1, wherein the linear internal olefin contains less than 20 wt. % branching based on the total amount of the linear internal olefin.

TABLE 2

| Base Fluid/Base Fluid Blend | Anaerobic Biodegradation Ratio, ≤1.0 is Pass | Pass/Fail | Sediment Toxicty Ratio, ≤1.0 is Pass | Pass/Fail |
| --- | --- | --- | --- | --- |
| Sarapar 147 (C14-17 linear paraffin) | 2.7 | Fail | 0.6 | Pass |
| NEOFLO 1-58 (C15-18 interanl olefin (IO), ca. 7% branching) | 0.6 | Pass | 0.7 | Pass |
| NEOFLO 1-68i (C1618 IO, ca. 20% branching) | 0.7 | Pass | 1.0 | Pass |
| SHELL C1618IO (LOT 1561366) (C15-18 IO, ca. 7% branching) | 0.6 | Pass | 0.6 | Pass |
| Sample B (C1618IO, ca. 40% branching) | 0.9 | Pass | 0.8 | Pass |
| Sample A (C1618 IO, ca. 27% branching) | 0.8 | Pass | 0.8 | Pass |
| Risella X415 | 6.1 | Fail | 0.1 | Pass |
| 30:70 Sarapar 147:NEOFLO 1-68i | 0.8 | Pass | 0.4 | Pass |
| 30:70 Sarapar 147:NEOFLO 1-58 | 0.8 | Pass | 0.8 | Pass |
| 30:70 Sarapar 147:SHELL LOT 1561366 C1618 IO | 0.8 | Pass | 0.6 | Pass |
| 30:70 Sarapar 147:Sample B C1618 IO | 1.1 | Fail | 0.5 | Pass |
| 30:70 Sarapar 147:Sample A C1618 IO | 1.2 | Fail | 0.9 | Pass |
| 15:85 Risella X 415:NEOFLO 1-58 | 0.6 | Pass | 0.9 | Pass |

BRR = Biodegradation Rate Ratio: Pass, BRR ≤ 1.0; Fail, BRR > 1.0
STR = Sediment Toxicity Ratio: Pass, STR ≤ 1.0; Fail, STR > 1.0

Results and Discussion

Test results for individual internal olefins, paraffins and olefin/paraffin blends are given in table 2. All internal olefin products tested pass both anaerobic biodegradation and sediment toxicity requirements in their pure form. Shell' products NEOFLO™ 1-58 and NEOFLO™ 1-68i have less branching and therefore biograde better than Sample A C16-18 IO and Sample B C1618 IO. This is reflected in the lower BRR values for the NEOFLO products. Linear hydrocarbons biodegrade more readily than branched ones.

Sarapar 147 does not pass the anaerobic biodegradation test because of its paraffinic nature. It does pass the sediment toxicity test. Blend testing showed that Shell' products NEOFLO™ 1-58 and NEOFLO™ 1-68i containing less the about 20% branching can be mixed with up to 30% of the Sarapar 147 and still pass the anaerobic biodegradation test with BRRs of 0.8. However, Sample A C1618 IO (ca. 27% branching), and Sample B C1618 IO (ca. 40% branching) with higher branching do not pass the anaerobic biodegradation test with this level of Sarapar 147 present (see Table 2) with BRRs of 1.2 and 1.1, respectively.

5. The drilling fluid according to claim 1, wherein the amount of the normal paraffin is at least 30 wt. % based on the total amount of the linear internal olefin and the normal paraffin.

6. The drilling fluid according to claim 1, wherein the olefin contains less than 10% branching and wherein the drilling fluid comprises Fischer-Tropsch normal paraffin in amount of at least 30 wt. % based on the total amount of the olefin and the Fischer-Tropsch normal paraffin.

7. A process to prepare a drilling fluid as defined according to claim 1, wherein the Fischer-Tropsch derived normal paraffin is added to the one or more linear internal olefin.

8. The process according to claim 7, wherein the amount of Fischer-Tropsch derived normal paraffin is in the range of from 15 to 30 wt. % based on the total amount of the olefin and the Fischer-Tropsch normal paraffin.

9. The process according to claim 7, wherein the linear internal olefin contains less than 10% branching.

10. The drilling fluid according to claim 1, wherein the linear internal olefin contains less than 20 wt. % branching, preferably less than 10 wt. % branching based on the total amount of the linear internal olefin.

11. The drilling fluid according to claim 1, wherein the amount of the normal paraffin is at least 40 wt. % based on the total amount of the linear internal olefin and the paraffin.

12. A method for drilling, comprising the step of
providing a drilling fluid comprising one or more linear internal olefin having from 15 to 18 carbon atoms and containing less than 25% branching based on the total amount of the linear internal olefin and a hydrogenated Fischer-Tropsch derived product comprising a Fischer-Tropsch normal parrafin having from 14 to 18 carbon atoms,
thereby increasing the anaerobic biodegradability and lowering the sediment toxicity of the one or more linear internal olefin and the hydrogenated Fischer-Tropsch derived products in drilling fluid compositions.

13. The method according to claim 12, wherein the drilling fluid has a linear internal olefin with 16 carbon atoms and a linear internal olefin with 18 carbon atoms.

14. The method according to claim 12, wherein the drilling fluid has a linear internal olefin with 15 carbon atoms and a linear internal olefin with 18 carbon atoms.

15. The method according to claim 12, wherein the linear internal olefin contains less than 20 wt. % branching based on the total amount of the linear internal olefin.

\* \* \* \* \*